United States Patent
Campiglio et al.

(10) Patent No.: US 12,069,478 B2
(45) Date of Patent: *Aug. 20, 2024

(54) MULTICAST CONTAINMENT IN A MULTIPLE PRE-SHARED KEY (PSK) WIRELESS LOCAL AREA NETWORK (WLAN)

(71) Applicant: Cisco Technology, Inc., San Jose, CA (US)

(72) Inventors: Ugo Mario Campiglio, Vaud (CH); Amine Choukir, Lausanne (CH); Roberto Muccifora, Ropraz (CH); Domenico Ficara, Essertines sur Yverdon (CH); Sachin Dinkar Wakudkar, Vaud (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,288

(22) Filed: May 30, 2023

(65) Prior Publication Data

US 2023/0308876 A1    Sep. 28, 2023

Related U.S. Application Data

(63) Continuation of application No. 17/147,319, filed on Jan. 12, 2021, now Pat. No. 11,665,544.

(51) Int. Cl.
*H04L 9/40* (2022.01)
*H04W 12/033* (2021.01)
(Continued)

(52) U.S. Cl.
CPC ....... *H04W 12/069* (2021.01); *H04W 12/033* (2021.01); *H04W 12/041* (2021.01); *H04W 12/71* (2021.01)

(58) Field of Classification Search
CPC ............ H04W 12/069; H04W 12/033; H04W 12/041; H04W 12/71; H04W 12/06; H04L 63/0428
See application file for complete search history.

(56) References Cited

U.S. PATENT DOCUMENTS 9,204,473 B2    12/2015    Wang et al.
10,750,366 B1    8/2020    Gundavelli
(Continued)

OTHER PUBLICATIONS

Chiu, Y-P., et al., "Secure multicast using proxy encryption"; researchgate.net, 2005; https://www.researchgate.net/publication/220739399. (281 pps).

(Continued)

*Primary Examiner* — Izunna Okeke
(74) *Attorney, Agent, or Firm* — Merchant & Gould P.C.

(57) ABSTRACT

A method for providing multicast frames in a Multi-Dwelling Unit (MDU) is provided herein. An Access Point (AP) can receive a join request from a first client device. The AP can generate a Group Master Key (GMK) from the Pre-Shared Key (PSK) associated with a Basic Service Set (BSS) that includes the first client device. The AP can then derive a Group Transient Key (GTK) from the GMK. The AP may then send the GTK to the first client device. Thereinafter, the AP can send multicast frames to the first client device encrypted by the GTK. The first client device can decrypt the multicast frames with the GTK. However, a second client device, that does not share the PSK, may receive the multicast frame but cannot decrypt the multicast frames.

20 Claims, 10 Drawing Sheets

(51) Int. Cl.
*H04W 12/041* (2021.01)
*H04W 12/06* (2021.01)
*H04W 12/069* (2021.01)
*H04W 12/71* (2021.01)

(56) References Cited

U.S. PATENT DOCUMENTS

| | | | |
|---|---|---|---|
| 2007/0171910 A1* | 7/2007 | Kumar | H04W 84/18 |
| | | | 370/392 |
| 2011/0264915 A1 | 10/2011 | Cam-Winget et al. | |
| 2014/0050320 A1 | 2/2014 | Choyi et al. | |
| 2015/0106625 A1 | 4/2015 | Yadav et al. | |
| 2017/0019785 A1 | 1/2017 | Liu et al. | |
| 2018/0227752 A1 | 8/2018 | Teyeb et al. | |
| 2019/0372973 A1 | 12/2019 | Gaonkar et al. | |
| 2020/0374789 A1 | 11/2020 | McCann et al. | |

OTHER PUBLICATIONS

Rios, Carlos et al. "Pre-shared Key RSN Extensions Backup" IEE-SA Mentor, Piscataway, NJ USA, vol. 802.11-1.0r0-, Jul. 9, 2002, pp. 1-17, XP017692485 [retrieved on Jul. 6, 2022].
Notification and Transmittal of the International Search Report the Written Opinion issued in International Application No. PCT/US2022/012013 and mailed Apr. 8, 2022 (16 pages).

\* cited by examiner

MULTICAST CONTAINMENT IN A MULTIPLE PRE-SHARED KEY (PSK) WIRELESS LOCAL AREA NETWORK (WLAN)

CROSS-REFERENCE TO RELATED APPLICATION

This application is a continuation of U.S. patent application Ser. No. 17/147,319, filed Jan. 12, 2021, the disclosure of which is incorporated herein by reference in its entirety.

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Wireless networks can provide access for workers to work in remote locations.

At Multi Dwelling Units (MDUs), e.g., university dorms, apartments, hospitals, with many connected devices that do not dispose of advanced authentication mechanisms, for example, dot1x, or when it is undesirable to have such mechanisms because of the imposed management overhead, the use of Pre-Shared Keys (PSKs) allows the user to connect in an easy way to the network and is wide spread. At the same time, having different Service Set IDentifiers (SSIDs) with a single PSK on each SSID is cluttering the air due to management frames.

There have been recent developments, for example, Cisco's introduction of mPSK and iPSK, that allow multiple PSKs on a single SSID. The mPSK uses the Extensible Authentication Protocol (EAP) Over LAN (EAPOL) exchange parameters of the Message 2 (M2) message to calculate which of the up to 5 configured passphrases matches the received security information. The iPSK requires an onboarding procedure to create a binding between the client Media Access Control (MAC) address and a PSK. Users that are authenticated, in such SSID, need to be able to discover their own devices though multicast protocols, such as Bonjour/multicast Domain Name System (mDNS), Simple Service Discovery Protocol (SSDP), and Link-Local Multicast Name Resolution (LLMNR). A user should not discover devices belonging to other users and that are using a different PSK. Multicast traffic should be contained to the devices that are sharing the same PSK.

BRIEF DESCRIPTION OF THE FIGURES

The accompanying drawings, which are incorporated in and constitute a part of this disclosure, illustrate various example of the present disclosure. In the drawings.

DETAILED DESCRIPTION

Overview

Figure 1:
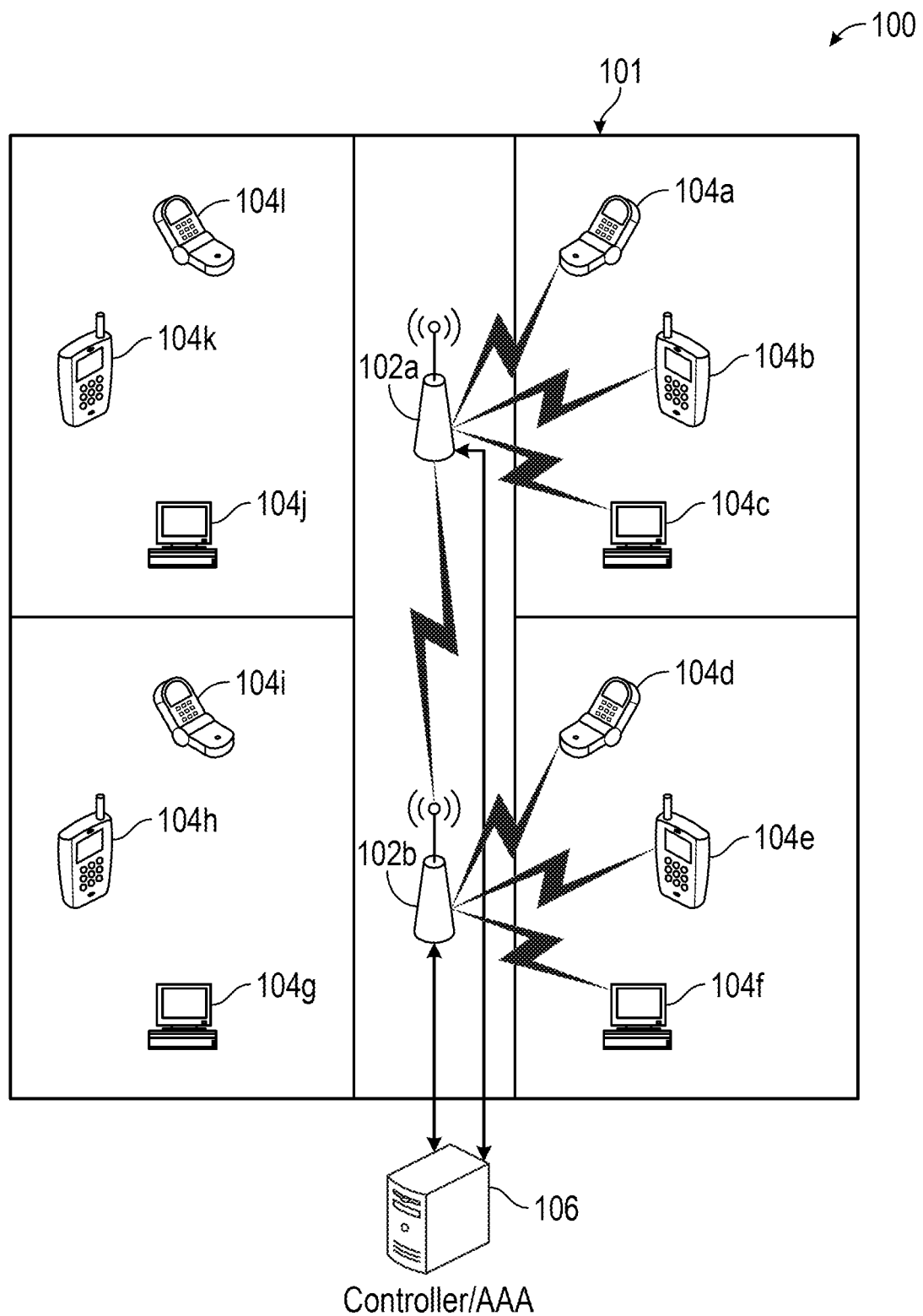
FIG. 1 is a block diagram of wireless network environment in accordance with aspects of the present disclosure.

An optimal method for providing multicast frames in a MDU is provided herein. An AP can receive a join request from a first client device. The AP can generate a Group Master Key (GMK) from the Pre-Shared Key (PSK) associated with a Basic Service Set (BSS) that includes the first client device. The AP can then derive a Group Transient Key (GTK) from the GMK. The AP may then send the GTK to the first client device. Thereinafter, the AP can send multicast frames to the first client device encrypted by the GTK. The first client device can decrypt the multicast frames with the GTK.

A second client devices, which shares the same PSK, may receive the GTK and also be able to decrypt the multicast frames. However, a third client device, which does not share the PSK, will not receive the GTK and, while the third client may receive the multicast frame, the third client device cannot decrypt the multicast frames without the GTK. Rather, when the third client device connects, the AP will generate a new GMK from the new PSK and derive a new GTK for the third client device.

Both the foregoing overview and the following description are examples and explanatory only, and should not be considered to restrict the disclosure's scope, as described and claimed. Furthermore, features and/or variations may be provided in addition to those described. For example, examples of the disclosure may be directed to various feature combinations and sub-combinations described in the implementations.

Example

The following detailed description refers to the accompanying drawings. Wherever possible, the same reference numbers are used in the drawings and the following description to refer to the same or similar elements. While example(s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Support of multicast containment in a flex deployment can be achieved with the following steps: 1) delivering multicast traffic to clients on same AP; 2) delivering multicast traffic to clients on other APs; 3) limiting wired traffic; and 4) extending to 802.1X.

In implementations, a device may belong to a group of devices, identified by a PSK, where the group also shares the same SSID. A group of devices can all be associated with the same user. It should be noted that the SSID can support multiple PSKs. Several users can connect to the same SSID. During the EAPOL 4-way exchange, once the PSK the client is using is determined, a Pairwise Transient Key (PTK) and a GTK are derived. The GTK can be derived from the Group Master Key (GMK) for the first client and then shared with successive clients sharing the same PSK so that each client can decrypt multicast frames.

In the aspects herein, a GMK, per PSK for a single SSID, may be generated by the controller or the AP, and a GTK can then be derived and shared with clients in the same PSK group. Any multicast traffic coming to the AP from one wireless client may then be broadcast using the GTK that is associated to that source client. Clients over the BSS can receive the frame, but only the ones that share the same PSK can decrypt the message.

As an extension, if multiple groups are allowed to communicate with each other, that is, create a supergroup, aspects herein can generate a GTK for the supergroup. In this situation, a group identifier is used to determine the GMK to be used for the clients. The relationship between PSKs and supergroups can be established at configuration.

In delivering multicast traffic to clients on other APs, discovery protocols multicast frames may be forwarded to the other APs. The number and size of those frames can be limited. Further, the aspects herein may rely on a feature, referred to as the iPSK peer-to-peer blocking feature that allows traffic between client devices to be blocked when those client devices are on the same SSID but do not share the same PSK. The peer-to-peer blocking feature can be activated on the same Wireless Local Area Network (WLAN). With this iPSKpeer-to-peer blocking feature, the tag provided for the feature can identify each PSK that is created at authentication and shared among the different APs in a Pairwise Master Key (PMK) cache.

Each AP receiving one of the multicast frames can check in the PMK cache for the iPSK peer-to-peer blocking tag that is associated with the frame source. The AP can then search for any local client that has the same iPSK peer-to-peer tag. If at least one client is found, the AP can send the multicast frame encrypting the frame with the GTK associated to the PSK group. As the GTK is shared between all clients using the same PSK, the frame can be received and decrypted by all of them. This solution allows delivering multicast frames only to the clients that are sharing the same PSK without duplicating such frame for each user.

In limiting wired traffic, the aspects herein can implement a MAC address rewrite using Extended Local Identifier multicast MAC. One ELI MAC address would be allocated per PSK group and protocol (e.g., mDNS). APs having at least one client for that PSK group would send an IGMP join to enable the switching infrastructure to do IGMP snooping and flood only the subset of wired ports having an AP with clients belonging to that PSK group.

Finally, with the extension to 802.1X, the use of a different GTK per user group can be also used. In such an environment, the key can be shared among the clients that authenticated with the same credentials (group) or a group of users within the same domain (supergroup). When containing multicast in a wireless BSSID with only some clients needing to receive the traffic, a solution is to use multicast to unicast transmissions. The aspects herein propose a more efficient air time containment of multicast and broadcast traffic in such an environment, where each user can receive the frames but only the targeted clients can decrypt them.

Implementations of a wireless environment 100 may be as shown in FIG. 1. The wireless environment 100 can include one or more of, but is not limited to, one or more APs 102, a client device 104, a Wireless LAN (WLAN) controller (WLC) 106, etc. These one or more systems 102-106 can be wireless devices 630, as described in conjunction with FIG. 6B. Further, the systems 102-106 can also be computing systems 600 as described in conjunction with FIG. 6A.

The wireless environment may include a building or other structure 101. The building or structure 101, can be a multi dwelling unit, for example, an apartment, a dormitory, a hospital, an office building, etc. As shown in the example of FIG. 1, the multi dwelling unit 101 may be divided into four separate rooms and have a dividing hallway. Each room may be occupied by a different user. Each user may have a set of one or more devices 104 associated with that user. For example, a first room may have devices 104a, 104b, and 104c associated with the first user. Room two can have devices 104d through 104f associated with another user. Room three may have devices 104g through 104 by associated with a third user, and finally, a fourth room may have devices 104j through 104l associated with the fourth user.

The environment 100 can also include one or more access points (APs) 102a, 102b. The access points 102 may provide wireless access to the devices 104. Each access AP 102 may communicate with the various devices 104 in the separate rooms. As such, the APs 102 may provide wireless access to two or more users using different devices within the multi dwelling unit 101. Further, the APs 102a and 102b may communicate with each other through a wired or wireless connection, as is shown in FIG. 1.

The wireless environment 100 can also include a WLC 106, which may also be referred to simply as the controller 106. The controller 106 may control actions of the APs 102. As such, the WLC 106 may be in communication with both AP 102a and AP 102b. Further, the WLC 106 may also function as an Authentication, Authorization, and Accounting (AAA) server. Thus, depending on the actions described herein, the WLC 106 may be alternatively described as an AAA server 106. The WLC 106 is shown as a single server, in FIG. 1, but may represent multiple different computing devices either physically located near or in the MDU 101, or physically separate and accessed through one or more networks, for example, the Internet or a cloud.

The wireless environment 100 can include a WLAN, which may be referred to as WLAN 100, network 100, wireless environment 100, etc., and which can include the one or more APs 102. The wireless environment 100 shows just two APs 102, but the wireless environment 100 can include two or more APs 102. The APs 102 can communicate with each other to conduct operations in concert.

The APs 102 may be in communication with one or more clients 104, which may also be referred to simply as devices 104. The clients 104 may be physically dispersed through a physical area covered by APs 102 of the WLAN 100. The clients 104 and the APs 102 may be wireless devices, as described in conjunction with FIG. 6B and may be computing systems, as described in conjunction with FIG. 6A. The network 100 can be controlled by a controller (not shown), e.g., a WLC, a network controller, etc. The controller may be a computer system, wireless device, and/or another device, as described in conjunction with FIGS. 6A and 6B.

As stated above and as shown in FIG. 1, the wireless network 100 may comprise Wi-Fi APs 102 that may be configured to support a wireless (e.g., Wi-Fi) network 100. The APs 102 may comprise a physical location where a user, operating a client 104, may obtain access to a wireless network 100 (e.g., Internet access), using Wi-Fi technology, via a WLAN using a router connected to a service provider.

In another example(s) of the disclosure, rather than APs 102, devices may be used that may be connected to a cellular network that may communicate directly and wirelessly with end use devices (e.g., a client 104 device) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client devices 104 may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network. The set of devices, e.g., 104a-104c, that are related as a group, for example, belong to one user, and possibly with the AP 102a may be considered a Basic Service Set (BSS). This BSS can share a key, e.g., the PSK, for encrypting and decrypting messages sent between devices 104a-104c and/or sent between the devices 104 and the AP 102. Each group in the building 101, e.g., group 104d-104f, 104g-104i, and/or 104j-104l may be a different BSS and share a different PSK.

The AAA server 106 can be a computing system that provides network access. The company AAA server 106 can conduct operations using one or more network protocols, e.g., the RADIUS protocol, and the Diameter counterpart Protocol. In some implementations, the company AAA server 106 can provide Internet Protocol (IP) functionality to support the functions of authentication, authorization and accounting.

The elements described above of the wireless network 100 (e.g., WLC 106, AP 102, client devices 104, etc.) may be practiced in hardware, in software (including firmware, resident software, micro-code, etc.), in a combination of hardware and software, or in any other circuits or systems. The elements of wireless network 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIGS. 6A and 6B, the elements of wireless network 100 may be practiced in a computing device 600 and/or wireless device 630.

Figures 3A, 3B:
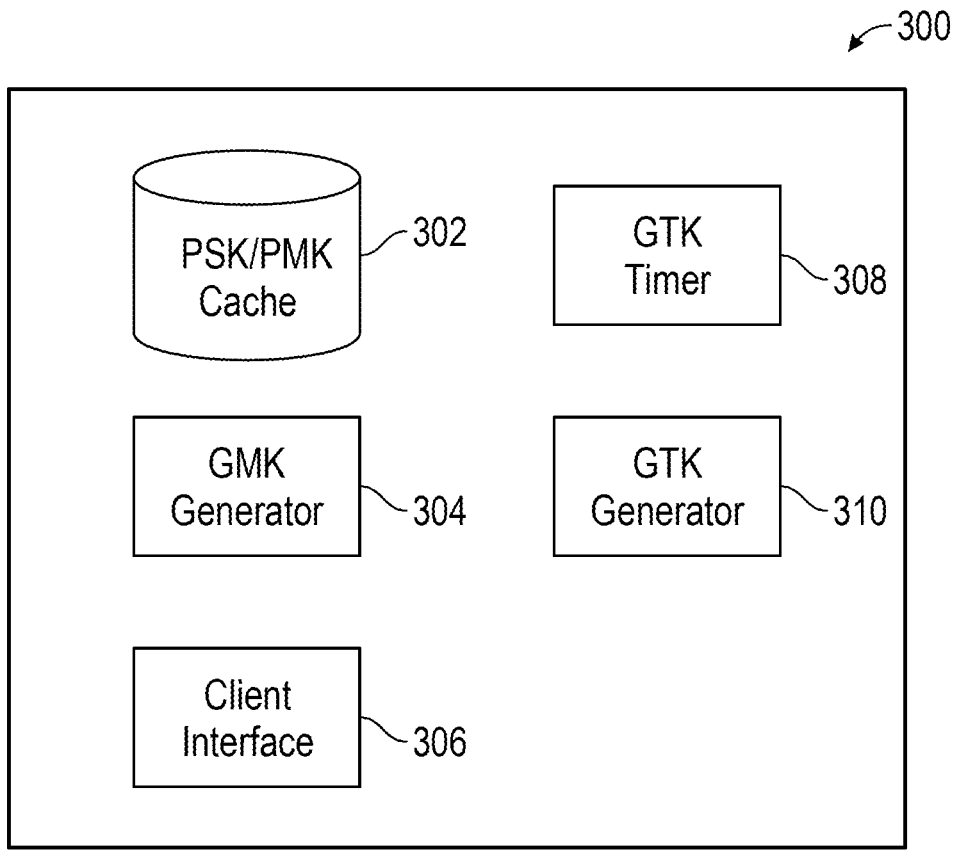
FIG. 3A is a block diagram of device components in accordance with aspects of the present disclosure.
FIG. 3B is a block diagram of a data structure in accordance with aspects of the present disclosure.
Figure 6A:
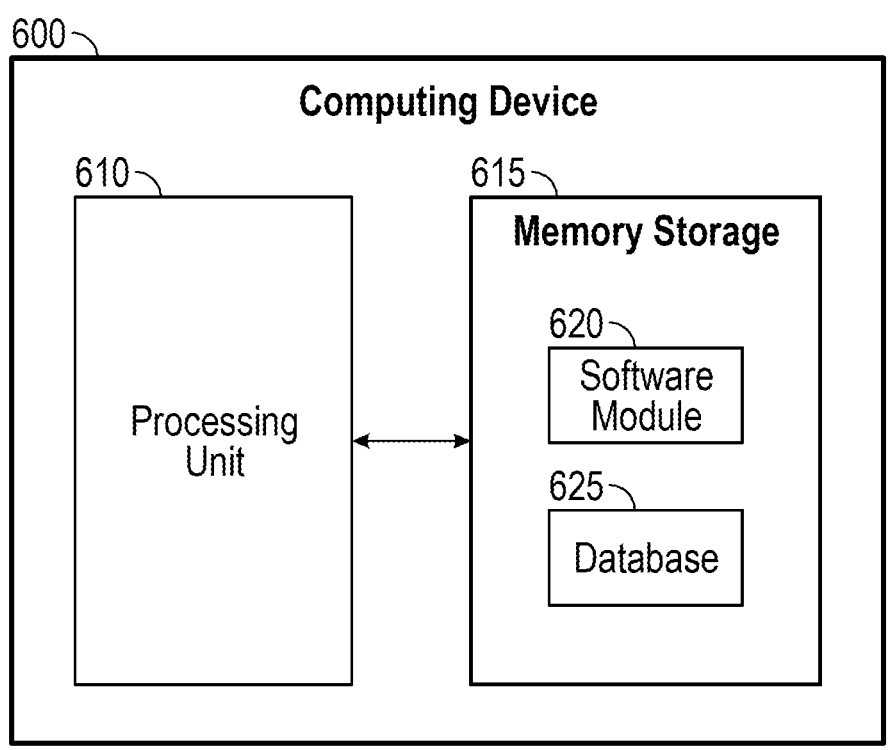
FIG. 6A is a block diagram of a computing device in accordance with aspects of the present disclosure.

An implementation of components 300, associated with any of the one or more devices, systems, servers, etc. 102-106, for conducting operations contained herein may be as shown in FIG. 3A. The components 300 may be part of or executed as part of the computing system 600 as is shown in FIG. 6A. The components 300 can include one or more of, but are not limited to, a Pre-Shared Key (PSK) cache 302, a Group Master Key (GMK) generator 304, a client interface 306, a Group Transient Key (GTK) timer 308, and/or a GTK generator 310. The components 300 may represent hardware and/or software capable of performing the operations described herein.

The PSK cache 302 can represent a data store, database, etc., that stores the PSK, GMK, GTK, and other information associated with one or more clients 104. The PSK cache 302 may be a memory or other storage device employed at the AP 102 or WLC 106 or distantly separated from the AP 102 or WLC 106 but accessible by those devices 102, 106. The PSK cache 302 may provide the ability to associate different types of data or information together.

An implementation of some of the data that may be stored in the PSK cache 302 may be as shown in FIG. 3B. Referring now to FIG. 3B, a type of data structure 312 that may be stored in the PSK cache 302 may be as shown in FIG. 3B. The data structure 312 can have one or more fields, as shown in FIG. 3B, but there may be one or more additional fields or may be fewer fields presented in each data structure 312. Further, each PSK 322 or BSSID 314 can include a different data structure 312. As such, the PSK cache 302 can include several of the data structures 312.

The data structure 312 can include one or more of, but is not limited to, a Basic Service Set IDentifier (BSSID) 314, a group identifier 316, a client identifier 318, and GMK 320, PSK 322, and/or a GTK 324. The BSSID 314 can be any type of identifier of the BSS. The BSS can be the collection of wireless or wired devices that may communicate together as a group within the network 100. The BSS may include the AP 102, which provide a connection onto a distribution system, e.g., the network 100, and its associated devices 104. The BSSID 314 can be a numeric, alphanumeric, Globally Unique IDentifier (GUID), a MAC address, an IP address, etc. The BSSID can identify the one or more APs 102, devices 104, and/or the WLC 106, involved in providing wireless access in a WLAN 100. The BSSID 314 can identify one or more of the components 102, 104, 106 as a collective. In other implementations, the BSSID 314 can consist of a SSID, which may identify the group the components 102a, 102b, 106, etc., and also a BSSID which identifies only one of those components within the service set, for example, AP 102a and devices 104a-104c.

Group ID 316 may be an identifier to identify a group of wireless clients 104. The group ID 316 can be a numeric ID, and alphanumeric ID, a GUID, another MAC address, an IP address, etc. Group ID 316 may associate one or more the devices in a group. For example, wireless devices 104a-104c may all include the same group ID 316 to identify those wireless devices 104 as part of a group associated with a user. Thus, the group ID 316 may identify the group of clients while the BSSID 314 identifies this group with an AP 102 as a BSS.

Client ID 318 can identify the user of the group having the group ID 316. The client ID 318 can include a username and password, or other information. In other implementations, the client ID 318 can identify a single device 104 from the group of devices, associated by the group ID 316. Thus, it may be possible to send information via client ID and/or group ID to one or more devices. The client ID 318 can be a numeric ID, an alphanumeric ID, a GUID, an IP address, etc.

The data structure 312 can also include one or more key(s) that may be used in authenticating a device(s) 104 to receive data. A first key, the GMK 320, can be a Group Master Key for the group identified by the group ID 316. The GMK 320 can be used in the four-way handshake between an AP 102 and a device 104. The GMK 320 can also be used to create or generate the GTK 324, which may be used with every access and then is shared with or connected to the client 104. This key 320 can be an encryption level device computed using one or more types of security algorithms. GMK 320 can be computed using different data, for example, timestamps, user IDs 318, etc. The information may be used to compute or develop a unique number or other type of key that allows for reception of and/or decryption of encrypted information sent between an AP 102 and a device 104. In implementations, the GMK 320 is derived from the PSK 322 rather than the PMK or from another key or other data. Thus, the GMK 320 is specific to a group of client devices, e.g., devices 104a-104c. When the GTK 324 is derived from this GMK 320, only devices that had access to the PSK 322 can use that GTK 324 to decrypt messages because the GMK 320 was specific to the PSK 322. In this way, multicast traffic is secured in a MDU or other building 101 with multiple groups of clients 104 because the multicast uses a group-specific GMK 320 and GTK 324.

The PSK 322 is another shared secret that may be shared between AP 102 and group of devices 104, and/or shared between different devices 104 of the group. The PSK 322 may be a key deviation function result that may be a result of using a symmetric key cryptographic algorithm. The PSK 322 may be used in Wired Equivalency Privacy (WEP), Wi-Fi Protected Access (WPA), or other types of authentication protocols, for example, Extensible Authentication Program (EAP). In implementations, the AP 102 and the client 104 shares the PSK for encrypting and decrypting data communicated between the device 104 and the AP 102. As such, the PSK 322 may be shared between the one or more devices 104a-104c, of the user, but not shared with other devices, e.g., client devices 104d-104f, which are not part of the group. Only the devices with the PSK 322 may be able to encrypt and decrypt data associated with the PSK 322, as communicated with the AP 102.

The GTK 324 may be a Group Transient Key, and/or Group Temporal Key. The GTK 324 may be another shared secret that is derived by an algorithm. The GTK 324 may be provided between one or more devices 104 to decrypt broadcast traffic from the AP 102. In implementations, the GTK 324 is derived from the GMK 320. Thus, the GTK 324 can be any type of key used to decrypt broadcast or multicast communications. It should be noted that the GTK 324 herein is derived from the GMK 320, rather than the PMK 322, and the GMK is derived from the PSK 322. Thus, only clients that share the PSK will be above to decrypt communications encrypted with the GTK because it was derived from the PSK, which is only known to the group.

Referring back to FIG. 3A, the GMK generator 304 can generate the GMK 320. The GMK generator 304 can generate the GMK 320 from the PSK 322, as described in FIG. 3B. The GMK generator 304 is operable to execute or conduct any type of algorithmic derivation from the PSK 322 to generate the GMK 320. The GMK generator 304 can also store the GMK 320, within data structure 312.

Client interface 306 is the interface, which may provide data or information associated with the keys or other types of security information, described herein, with the one or more devices 104. Client interface 106 can be operable to send or receive messages from devices 104, the AP 102, or WLC 106. Client interface 306 may also be operable to form and send messages, to receive those messages, and to derive information therefrom. The client interface 306 can provide or receive information that may be stored or derived into one or more of the IDs or keys stored in data structure 312.

The GTK timer 308 may be any type of timer that can age the GTK 324. Thus, when the GTK 324 is generated, the GTK timer 308 can establish a time when that GTK 324 no longer becomes valid. The timer information may be stored with the GTK 324, for example, as metadata. The GTK timer 308 can then check the timer information stored in data structure 324 to determine if the GTK 324 lapses and a new GTK 324 must be generated.

The GTK generator 310 may be any function to generate the GTK 324. For example, the GTK generator 310 can generate the GTK from the GMK 320 and store that key information in field 324 of data structure 312. Thus, the GTK generator 310 can execute or perform any function or algorithm required to generate the GTK 324 from the GMK 320. Further, the GTK generator 310 can signal the GTK timer 308, when the GTK is created to provide any timer information metadata, as described previously.

Figure 2A:
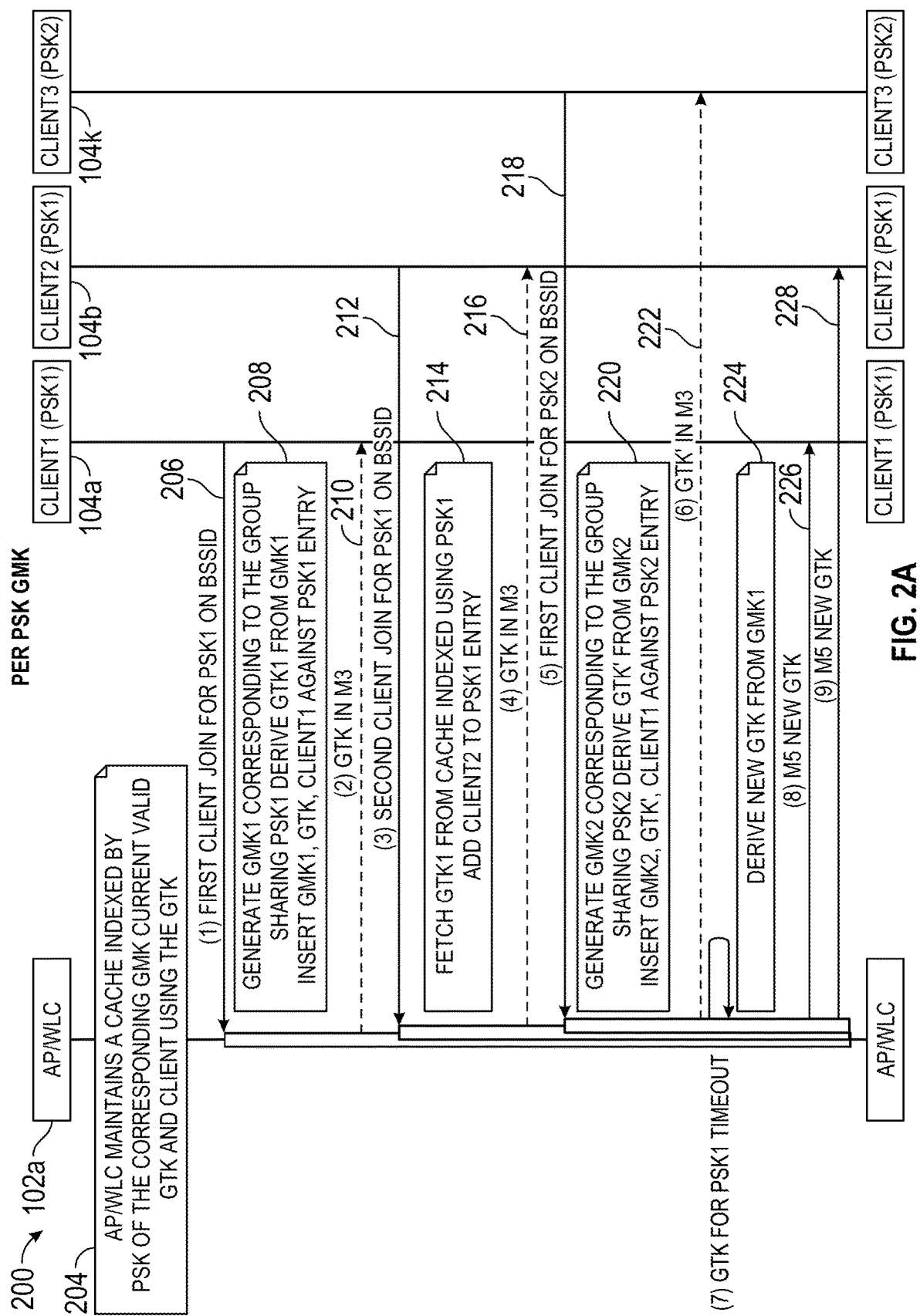
FIG. 2A is a signaling or signpost diagram of a signaling process for establishing a Group Transient Key (GTK) in accordance with aspects of the present disclosure.

Referring now to FIGS. 4A through 5B, the various methods 400, 416, 500, 512 will be explained hereinafter with reference to the systems or environment 100, the signaling diagrams 200 and 230 of FIGS. 2A and 2B, the components 300 of FIG. 3A, the data structure 312, of FIG. 3B, etc. The method 400 can start with a start operation and can end with an end operation. The method 400 can include more or fewer stages or can arrange the order of the stages differently than those shown in FIG. 4A. The method 400 can be executed as a set of computer-executable instructions, executed by a computer system or processing component, and be encoded or stored on a storage medium. Further, the method 400 can be executed by a gate or other hardware device or component in an ASIC, a FPGA, a SOC, or other type of hardware device. Hereinafter, the method 400 shall be explained with reference to the systems, components, modules, software, signals, data structures, etc. described herein.

An AP 102, or the WLC 106, can receive a first client join request for a PSK, on the BSSID, in stage 402. A client, for example, device 104a, can send a client join request for a PSK 322 associated with the BSSID 314. The AP 102a or WLC 106 can receive this first client join request as signal 232 from client 104a. The client interface 306, of the AP 102 or WLC 106, can receive the first client join request.

The AP 102 or WLC 106 can then generate the GMK 320 that corresponds to the PSK 322 of the group, in stage 404. Here, the PSK 322 may be extracted from the signal 232 received by the AP 102/WLC 106. The GMK generator 304 may then generate the GMK 320 from the PSK 322. In other implementations, the AP 102 or WLC 106 may maintain a cache, for example, the PSK cache 302, indexed by PSK values 322, which stores to the GMK 320, which may have been previously produced. Thus, the GMK 320 may be retrieved in some situations.

The AP 102 or WLC 106 may then derive a GTK 324, for clients identified by client ID 318, using the GMK 320, in stage 406. In other cases, GTK generator 310 can generate the GTK corresponding to the PSK 322 using the GMK 320 as the input. Thus, the AP 102 or WLC 106 can store the GMK 320, GTK 324, and other data, in the data structure 312, of the PSK cache 302, and as associated with the PSK 322. The entire data structure 312 may be generated or completed and stored in the PSK cache 302, including the BSSID 314, group ID 316, client ID 318, GMK 320, PSK 322, and GTK 324, in stage 408. The GMK generator 304, GTK generator 310, or other component can store the data 314-324 into data structure 312 of the PSK cache 302.

The AP 102 or WLC 106 may then send the GTK 324 to the client 104, in stage 410. The GTK 324 may be inserted in one of the handshake messages, for example, the EAPOL M3 message, and can be sent to the client 104. The client interface 306 can generate the EAPOL M3 message with the GTK to send to the client.

Optionally, the AP 102 or the WLC 106 may receive a second join message from a second client, e.g., client 104b, in stage 412. Here, the AP 102 or WLC 106 may receive the second join signal 212, from a second client 104b. The second join can include the same PSK 322 that was received from the original first client 104a on this BSSID, identified by BSSID 314. The client interface 306 can receive the second join and send the join information to the other components 304-310.

The GTK timer 308 may then determine if the GTK. 324, which was derived for the first client 104, has timed out, in stage 414. Here, the client interface 306 may send a message to the GTK timer 308. The GTK timer 308 can retrieve the GTK 324 from the PSK cache 302. The GTK timer 308 may have previously created metadata for the GTK 324 to determine how long the GTK 324 is valid. If the GTK 324 is past the time set previously and has timed out, the method 414 may proceed YES back to stage 406 to derive a new GTK 324. However, if the GTK 324 has not timed out, the method 414 may proceed NO back to stage 410 to send the GTK 324 to the new client 104b. The GTK 324 for the second client 104b may be retrieved and sent in in signal EAPOL M3 to the second client 104b in signal 216.

A third client 104k of a second client group may also derive a GMK, GTK. For example, the third client 104k may send signal 218 to the AP 102 or WLC 106 for another client join with a different PSK, for example, PSK2, on the same BSSID. The AP 102 or WLC 106 may generate a second GMK 320, corresponding to the group sharing the second PSK, and then derive that second GTK 324. The GMK 320, GTK 324, and the new client ID 318 may then be stored against the PSK 322, in the PSK cache 302. The new GTK 324 may also be sent to the third client in the EAPOL M3 message, in signal 222. Thus, similar to stages 208 and 210, the third client 104k can request the AP 102, or WLC 106, to conduct operation 220 and send signal 222.

In situations where the GTK is timed out as determined in operation 414, the AP 102, or the WLC 106, may derive a new GTK 324 from the original GMK 320 in stage 406. This new GTK 324 can be sent to the first client 104a as an EAPOL M5 message, in signal 226, and to the second client 104b, as an EAPOL M5 message, in signal 228. As such, the new GTK 324 is derived by the GTK generator 310 based on a timeout, and all clients 104, associated with that PSK 322, may receive the new GTK 324.

Figure 4A:
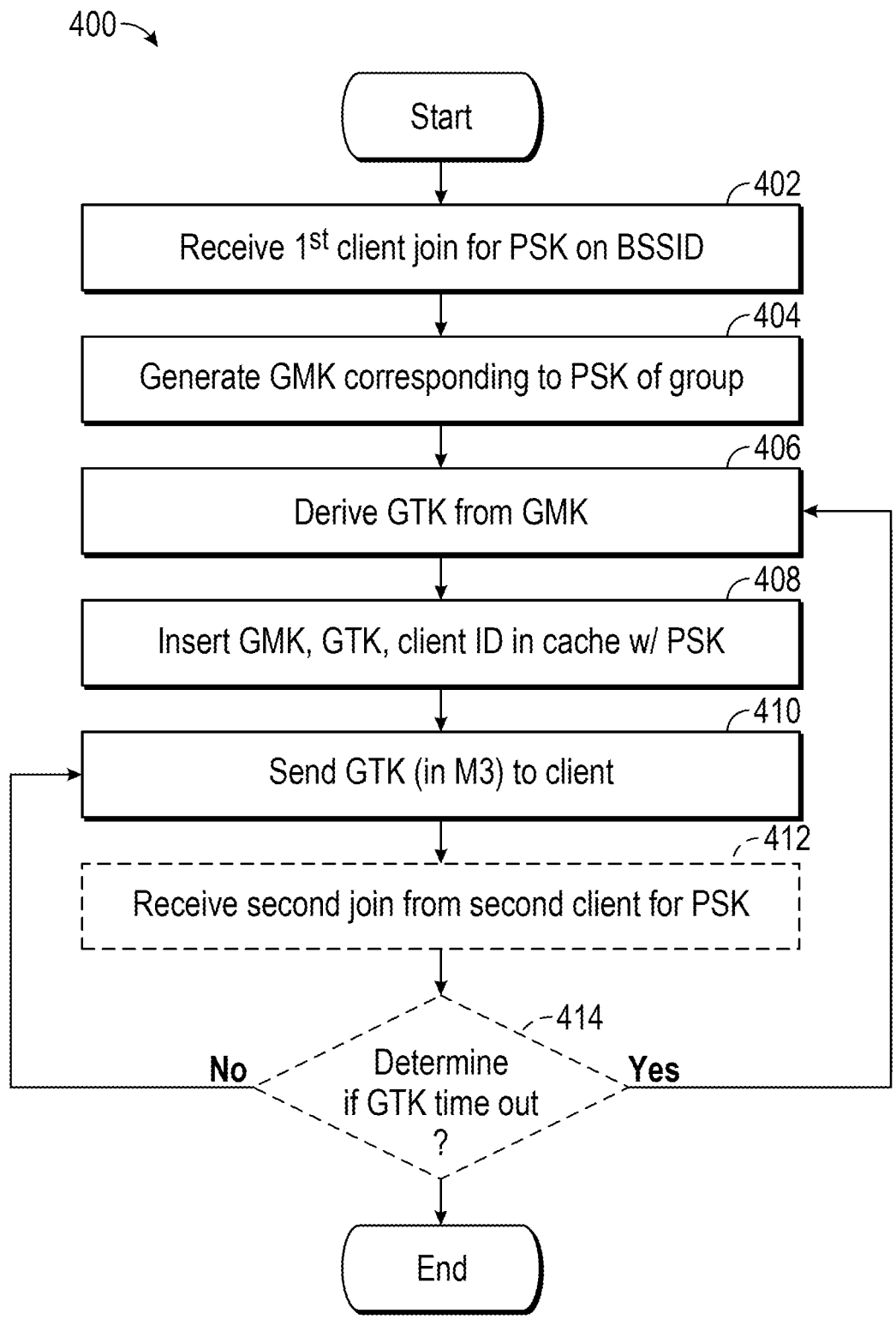
FIG. 4A is a flow chart of a method for generating a GTK in accordance with aspects of the present disclosure.
Figure 4B:
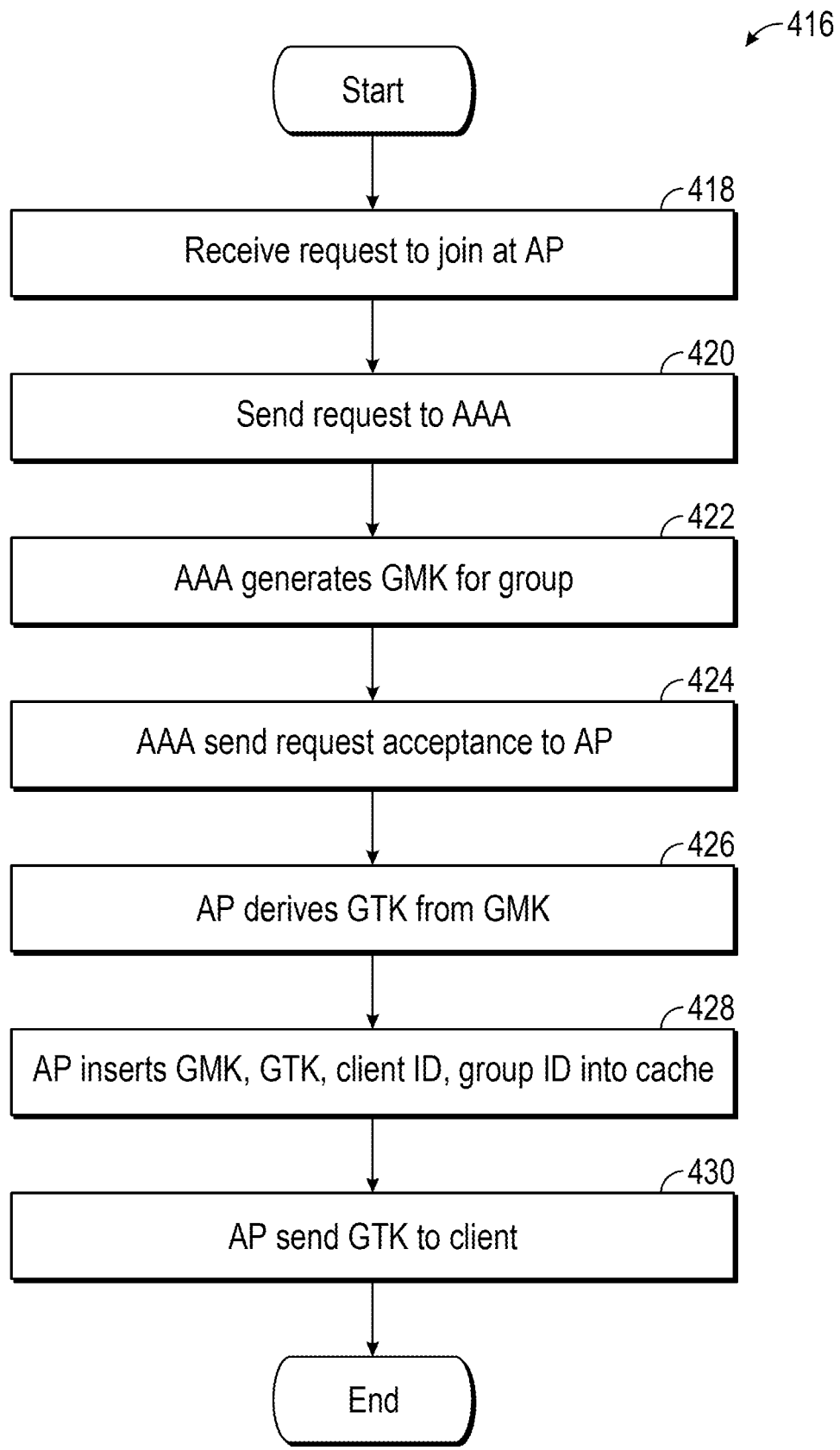
FIG. 4B is another flow chart of a method for generating a GTK in accordance with aspects of the present disclosure.

Referring now to FIG. 4B a method 416 based dot1X GMK generation may be shown. The method 416 can start with a start operation and can end with an end operation. The method 416 can include more or fewer stages or can arrange the order of the stages differently than those shown in FIG. 4B. The method 416 can be executed as a set of computer-executable instructions, executed by a computer system or processing component, and be encoded or stored on a storage medium. Further, the method 416 can be executed by a gate or other hardware device or component in an ASIC, a FPGA, a SOC, or other type of hardware device. Hereinafter, the method 416 shall be explained with reference to the systems, components, modules, software, signals, data structures, etc. described herein.

An AP 102 (or WLC 106) may receive a request to join the AP 102, in stage 418. A client 104a may send a join signal 232 to the AP 102 or WLC 106. This join request 232 may be received by the client interface 306 of the AP 102 (or WLC 106). Thereinafter, the AP 102 (or WLC 106) may send a request for access to the AAA server 106, in stage 420. The AP 102 (or WLC 106) may send the access request in signal 234 to the AAA server 106. Thereinafter, the AAA server 106 generates the GMK for the group, in stage 422. The AAA server 106 can first generate the GMK corresponding to group ID 316. The generation of the GMK 320 can be done by a GMK generator 304 and may be based off of the PSK 322. The GMK 320 can then be stored in the PSK cache 302 and associated with group 1, having the group ID 316. The AAA server 106 may then send the acceptance of the request back to the AP 102 (or WLC 106), in stage 424. Here, the AAA service 106 can send signal 238 that includes the acceptance of the access request and can include both the GMK 320 and the group ID 316 for the AP 102 (or WLC 106).

With the acceptance of the access request, the AP 102 (or WLC 106) can then derive the GTK 324 from the GMK 320, in stage 426. The AP 102 (or WLC 106) can perform operation 240, 242 to derive the GTK 324 from the GMK 320. The GTK generator 310 can derive the GTK 324 from the GMK 320 by conducting processes or solving algorithms. Then, the GTK 324, GMK 320, and client ID 318 may be added to the data structure 312 in the PSK cache 302, in operation 242. The AP 102 (or WLC 106) can insert this information into the data structure 312, in stage 428, including the GTK 324, GMK 320, client ID 318, and the group ID 316 into the cache 302. The GTK 324, GMK 320, and client ID 318 may then send the GTK 324 to the client 104, in stage 430. Here, the client interface 206 can create the EAPOL M3 message and send that message to the client 104, in signal 244.

Figure 2B:
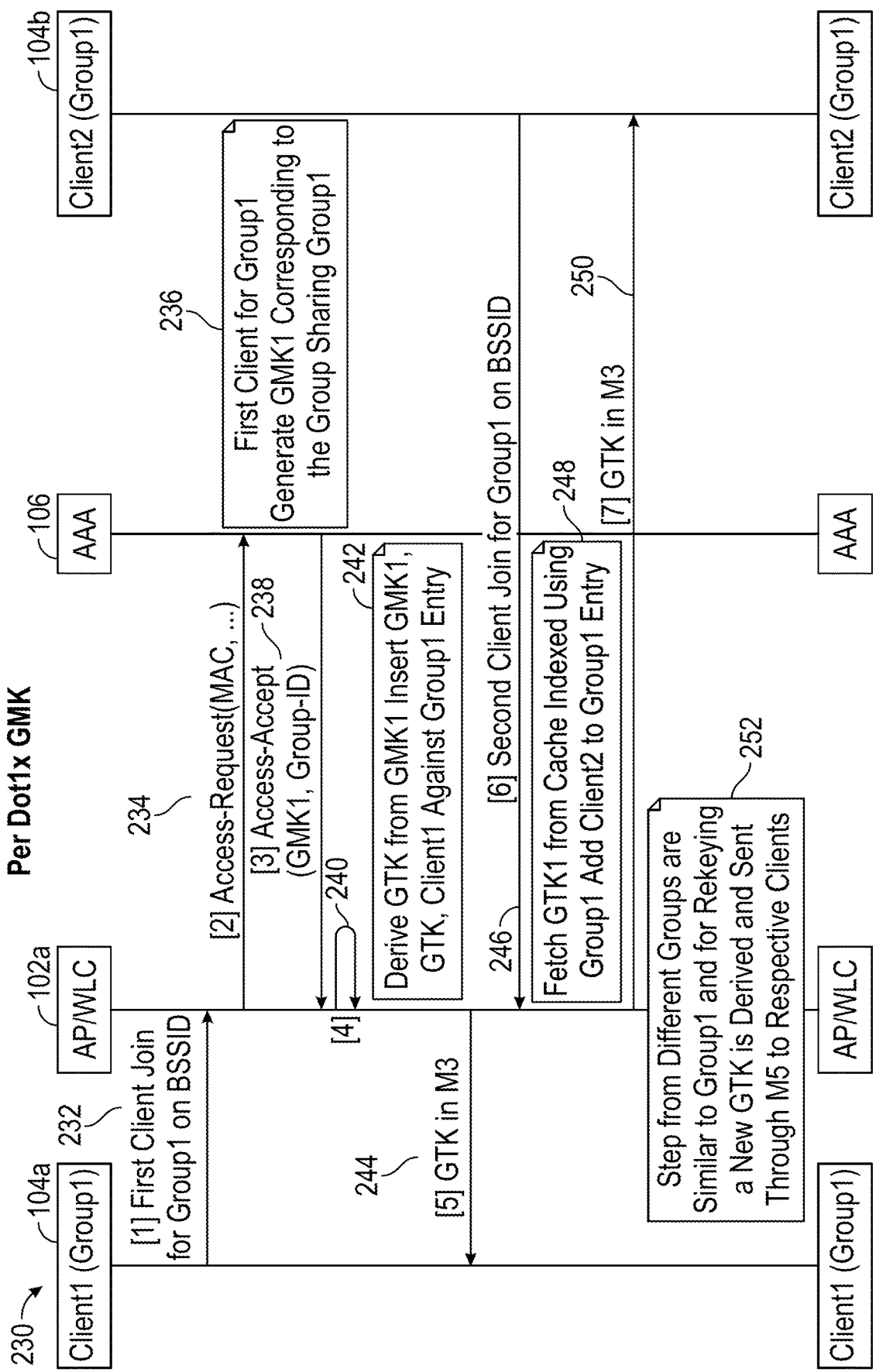
FIG. 2B is another signaling or signpost diagram of a signaling process for establishing a GTK in accordance with aspects of the present disclosure.

As shown in FIG. 2B, a second client 104b may send a second join for a different group on the BSSID 314. The client 2 104b may send signal 246 to the AP 102 (or WLC 106). The AP 102 (or WLC 106) can fetch the GTK 324 from the cache 302 and add the client's ID 318 to data structure 312 for the group ID 316. The AP 102 (or WLC 106) can send the GTK 324 in the EAPOL M3 message, in signal 250. The client interface 306 may compose the EAPOL M3 message and send it to the client 104b. Further, as explained in conjunction FIG. 4A, the GTK may be rekeyed or derived again, if it is expired and send a new GTK 324 in the EAPOL M5 messages, in operation 252, back to client 1 104a and client 2 104b.

It should be noted that there is the possibility of creating a group ID 316 of multiple groups. In other words, a "supergroup" may be comprised of two or more groups. Thus, the new group ID 316 is created for the supergroup and then a new GMK 320 may be derived or determined from this new group ID 316. Thereinafter, the GTK generator 310 can generate a new GTK of 324 for the supergroup. The supergroup can include more than one PSKs, as different clients having different PSKs may be part of the supergroup. As such, the multicast to the supergroup can be based on the GMK and the GTK, and clients 104 with the GTK 324 and the one or more of the PSKs associate of the supergroup may be able to decrypt the messages. Thus, the AP 102 (or WLC 106) may need to encrypt the messages for the supergroup using one or more of the different PSKs 322.

Figure 5A:
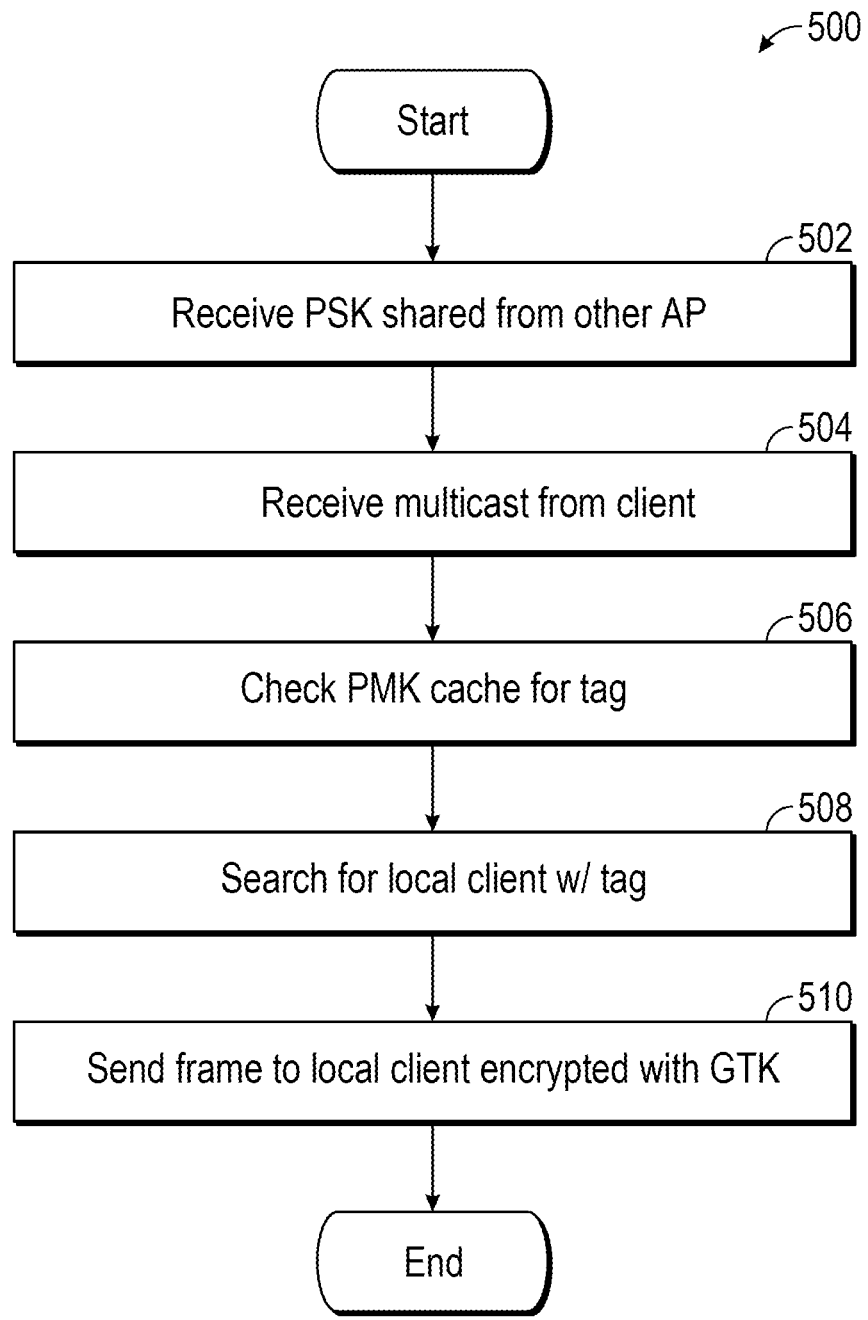
FIG. 5A is a flow chart of a method for sending multicast frames in accordance with aspects of the present disclosure.

A method 504 for providing multicast frames from another AP 102 may be as shown in FIG. 5A. The method 500 can start with a start operation and can end with an end operation. The method 500 can include more or fewer stages or can arrange the order of the stages differently than those shown in FIG. 5A. The method 500 can be executed as a set of computer-executable instructions, executed by a computer system or processing component, and be encoded or stored on a storage medium. Further, the method 500 can be executed by a gate or other hardware device or component in an ASIC, a FPGA, a SOC, or other type of hardware device. Hereinafter, the method 500 shall be explained with reference to the systems, components, modules, software, signals, data structures, etc. described herein.

Discovery protocol multicast frames can be forwarded to other APs 102. However, it should be noted that it is possible that the number and size of those discovery protocol frames may be limited. Further, the AP 102 (or WLC 106) may rely on iPSK peer-to-peer blocking. This feature can include a tag that identifies each PSK that is created at authentication and shared among the different APs 102 in the environment 100. Thus, the tag allows for understanding which clients 104 may be in communication with each AP 102 and for sharing PSK information from the PMK or PSK cache 302.

The second AP 102b may receive the PSK 322, shared from the first AP 102a, in stage 502. Here, APs 102 can share PSKs created at authentication. These shared PSKs 322 can be stored in the PMK cache.

The AP 102b may want to receive a multicast frame from the client 104, in stage 504. The multicast frame can be sent from a client, for example, client 104a. The AP 102b can check the PMK cache for the iPSK peer-to-peer blocking tag associated with the frame source, e.g., the client 104a, in stage 506. This tag in the iPSK peer-to-peer blocking information may be stored in the PMK cache and accessible by the AP 102a.

The AP 102b can then search for a local client, e.g., client 104b, that may be associated with the tag, in stage 508. Thus, the AP 102b can search the PMK cache for the client 104 with the tag. Upon finding the local client 104b with this tag, the AP 102b can encrypt the multicast frame with the GTK 324, associated with the PSK of the group, including device 104b. Thus, the AP 102b can determine the PSK based on the client ID 318 and GTK 324 or group ID 316.

The multicast frame may be encrypted by the GTK 324. The AP 102 (or WLC 106) can then send the frame to the local client, as encrypted by the GTK 324, in stage 510. Thus, the AP 102b can send the multicast frames to a local client 104b. It should be noted that the process above can be reversed with AP 102b sharing the keys and the AP 102a searching for and sending multicast frames to a local client 104b.

In other implementations, the AP 102a can transmit the multicast frames to the other AP 102b or to the client 104b. In implementations, the client interface 206 can send this encrypted multicast frame to the device 104. In other configurations, the AP 102 may send the multicast frame to another AP 102b to be encrypted and sent to another client 104. In this way, the process 500 allows for delivering multicast frames to clients 104 that are sharing the same PSK 322. This process 500 prevents duplication of the frame for each user. In other words, the multicast frames can be broadcast with the GTK 324 encryption and only clients 104 with access to the PSK may decrypt the frame(s).

Figure 5B:
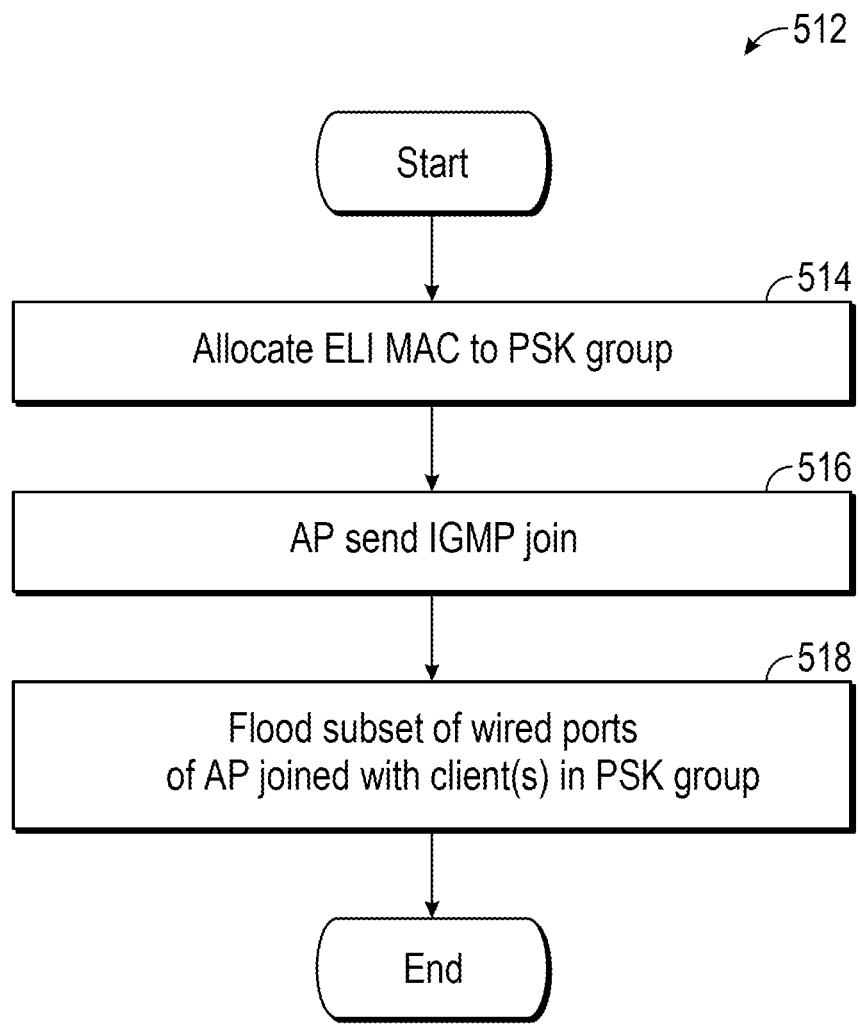
FIG. 5B is another flow chart of a method for sending multicast frames in accordance with aspects of the present disclosure.

A method 512 for limiting wired traffic may be as shown in FIG. 5B. The method allows for limiting traffic on the wired-side by implementing a MAC address rewrite using Extended Local Identifier multicast MAC (ELI MAC). The method 512 can start with a start operation and can end with an end operation. The method 512 can include more or fewer stages or can arrange the order of the stages differently than those shown in FIG. 5B. The method 512 can be executed as a set of computer-executable instructions, executed by a computer system or processing component, and be encoded or stored on a storage medium. Further, the method 512 can be executed by a gate or other hardware device or component in an ASIC, a FPGA, a SOC, or other type of hardware device. Hereinafter, the method 512 shall be explained with reference to the systems, components, modules, software, signals, data structures, etc. described herein.

An AP 102 (or WLC 106) can allocate one ELI MAC to the PSK group, in stage 514. This identifier ELI MAC can identify the PSK group and or protocol. The identifier may be stored in data structure 312, of the PSK cache 302. The ELI MAC can be metadata of the PSK 322 or another field not shown in FIG. 3B.

The AP 102 (or WLC 106) can then send an Internet Group Management Protocol (IGMP) join to enable the switching infrastructure and IGMP snooping, in stage 516. Here, the AP 102 (or WLC 106) associates the PSK group or client ID 318 with the and the PSK 322 with the ELI MAC identifier, and can send the IGMP join signal to the group identified by the ELI MAC identifier. These operations allow for snooping or flooding wired ports at the AP.

The AP 102 (or WLC 106) can then flood a subset of wired ports associated with the client 104 and the PSK group. The ports associated with the group may be identified by the ELI MAC identifier. The AP 102 (or WLC 106) can flood these identified ports with the multicast frames. In this way, the AP 102 (or WLC 106) may send messages to all other APs 102 or send multicast frames to the other APs having clients 104 that need to receive the multicast transmission. Thus, the wired APs also receive the multicast frames.

FIG. 6A shows computing device 600. As shown in FIG. 6A, computing device 600 may include a processing unit 610 and a memory unit 615. Memory unit 615 may include a software module 620 and a database 625. While executing on processing unit 610, software module 620 may perform, for example, processes for determining antenna power output, as described above with respect to FIGS. 1-5B. Computing device 600, for example, may provide an operating environment for the controller, the APs 102, the client's 104, WLC/AAA server 106, and other devices may operate in other environments and are not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Figure 6B:
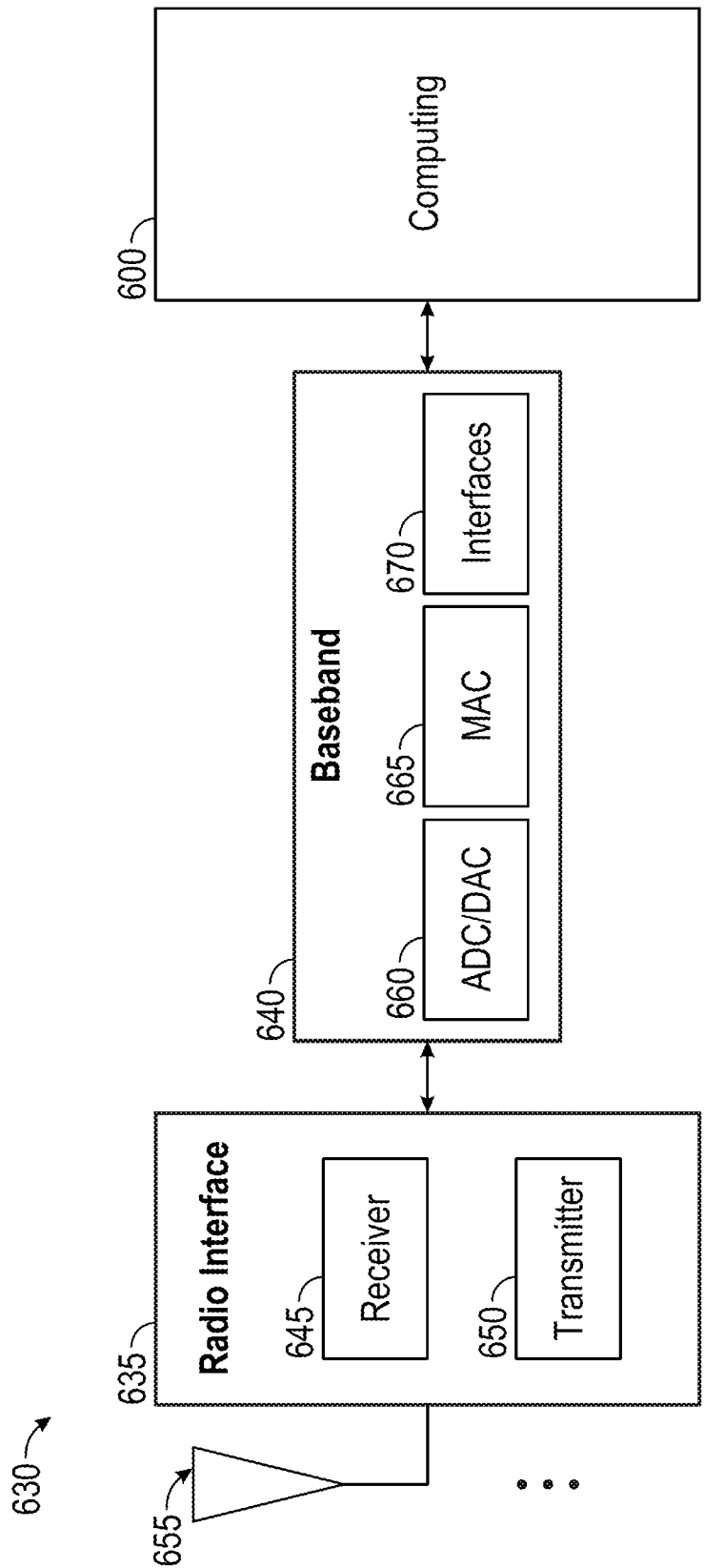
FIG. 6B is a block diagram of a wireless device in accordance with aspects of the present disclosure.

FIG. 6B illustrates an implementation of a communications device 630 that may implement one or more of APs 102, the clients 104, WLC/AAA server 106, etc., of FIGS. 1-5B. In various implementations, device 630 may comprise a logic circuit. The logic circuit may include physical circuits to perform operations described for one or more of APs 102, the clients 104, WLC/AAA server 106, etc., of FIGS. 1-5B, for example. As shown in FIG. 6B, device 630 may include one or more of, but is not limited to, a radio interface 635, baseband circuitry 640, and/or computing platform 600.

The device 630 may implement some or all of the structures and/or operations for APs 102, the clients 104, WLC/AAA server 106, etc., of FIGS. 1-5B, storage medium, and logic circuit in a single computing entity, such as entirely within a single device. Alternatively, the device 630 may distribute portions of the structure and/or operations using a distributed system architecture, such as a client-server architecture, a peer-to-peer architecture, a master-slave architecture, etc.

A radio interface 635, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-error interface or modulation scheme. The radio interface 635 may include, for example, a receiver 645 and/or a transmitter 650. Radio interface 635 may include bias controls, a crystal oscillator, and/or one or more antennas 655. In additional or alternative configurations, the radio interface 635 may use oscillators and/or one or more filters, as desired.

Baseband circuitry 640 may communicate with radio interface 635 to process, receive, and/or transmit signals and may include, for example, an Analog-To-Digital Converter (ADC) for down converting received signals with a Digital-To-Analog Converter (DAC) 660 for up converting signals for transmission. Further, baseband circuitry 640 may include a baseband or PHYsical layer (PHY) processing circuit for the PHY link layer processing of respective receive/transmit signals. Baseband circuitry 640 may include, for example, a Medium Access Control (MAC) processing circuit 665 for MAC/data link layer processing. Baseband circuitry 640 may include a memory controller for communicating with MAC processing circuit 665 and/or a computing platform 600, for example, via one or more interfaces 670.

In some configurations, PHY processing circuit may include a frame construction and/or detection module, in combination with additional circuitry such as a buffer memory, to construct and/or deconstruct communication frames. Alternatively or in addition, MAC processing circuit 665 may share processing for certain of these functions or perform these processes independent of PHY processing circuit. In some configurations, MAC and PHY processing may be integrated into a single circuit.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Node that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other examples may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 600 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
   receiving, by a computing device, a join request from a first client device;
   generating, by the computing device, a Group Master Key (GMK) from a Pre-Shared Key (PSK) associated with a Basic Service Set (BSS);
   deriving, by the computing device, a Group Transient Key (GTK) from the GMK;
   sending, by the computing device, the GTK to the first client device;
   receiving, by a second computing device, a peer-to-peer blocking tag generated by the computing device during authentication with the PSK of the first client device;
   receiving, by the second computing device, the PSK from the computing device;
   receiving, by the second computing device, a multicast frame from the first client device;
   searching, by the second computing device and in a PMK cache, for a local client device associated with the tag; and
   sending, by the second computing device, the multicast frame to the local client device encrypted by the GTK.

2. The method of claim 1, further comprising: sending multicast frames to the first client device encrypted by the GTK.

3. The method of claim 2, wherein the first client device decrypts the multicast frames based on the GTK.

4. The method of claim 1, further comprising: inserting the GMK, the GTK, the PSK, and a client Identifier (client ID), associated with the first client device, into a cache.

5. The method of claim 4, wherein the cache is indexed by the PSK.

6. The method of claim 1, further comprising:
   receiving a second join request from a second client device, wherein the second join request is associated with the BSS having the PSK; and
   sending the GTK to the second client device.

7. The method of claim 6, further comprising:
   before sending the GTK, determining if the GTK has timed out; and
   if the GTK has time out, deriving a second GTK from the GMK.

8. The method of claim 7, further comprising:
   resending the second GTK to the first client device; and
   sending the second GTK to the second client device.

9. The method of claim 8, wherein generating the GMK comprises:
   sending the join request to a Authentication, Authorization, Accounting (AAA) server, wherein the AAA server generates the GMK; and
   receiving the GMK from the AAA server.

10. A system comprising:
    a memory storage; and
    a processing unit coupled to the memory storage, wherein the processing unit is operative to:
      receive a join request from a first client device;
      generate a Group Master Key (GMK) from a Pre-Shared Key (PSK) associated with a Basic Service Set (BSS);
      derive a Group Transient Key (GTK) from the GMK;
      send the GTK to the first client device; and
      send multicast frames to the first client device encrypted by the GTK, wherein the first client device decrypts the multicast frames based on the GTK, wherein a second client device, that does not share the PSK, receives the multicast frame but cannot decrypt the multicast frames
      receive, from a second computing device, a peer-to-peer blocking tag generated by the second computing device during authentication of the second client device associated with a second PSK;
      store the tag in a PMK cache;
      receive the second PSK from the second computing device;
      store the second PSK in the PMK cache;
      receive a second multicast frame from the second client device;
      search, in the PMK cache, for a local client device associated with the tag; and
      send the multicast frame to the first client device encrypted by a second GTK associated with the second PSK.

11. The system of claim 10, the processing unit is further operative to: insert the GMK, the GTK, the PSK, and a client Identifier (client ID), associated with the first client device, into a cache, wherein the cache is indexed by the PSK.

12. A computer-readable medium that stores a set of instructions which when executed perform a method executed by the set of instructions comprising:
    receiving, by a computing device, a join request from a first client device;
    generating, by the computing device, a Group Master Key (GMK) from a Pre-Shared Key (PSK) associated with a Basic Service Set (BSS);
    deriving, by the computing device, a Group Transient Key (GTK) from the GMK;
    sending, by the computing device, the GTK to the first client device;
    receiving, by a second computing device, a peer-to-peer blocking tag generated by the computing device during authentication with the PSK of the first client device;
    receiving, by the second computing device, the PSK from the computing device;
    receiving, by the second computing device, a multicast frame from the first client device;
    searching, by the second computing device and in a PMK cache, for a local client device associated with the tag; and
    sending, by the second computing device, the multicast frame to the local client device encrypted by the GTK.

13. The computer-readable medium of claim 12, further comprising: sending multicast frames to the first client device encrypted by the GTK.

14. The computer-readable medium of claim 13, wherein the first client device decrypts the multicast frames based on the GTK.

15. The computer-readable medium of claim 12, further comprising: inserting the GMK, the GTK, the PSK, and a client Identifier (client ID), associated with the first client device, into a cache.

16. The computer-readable medium of claim 15, wherein the cache is indexed by the PSK.

17. The computer-readable medium of claim 12, further comprising:
   receiving a second join request from a second client device, wherein the second join request is associated with the BSS having the PSK; and
   sending the GTK to the second client device.

18. The computer-readable medium of claim 17, further comprising:
   before sending the GTK, determining if the GTK has timed out; and
   if the GTK has time out, deriving a second GTK from the GMK.

19. The computer-readable medium of claim 18, further comprising:
   resending the second GTK to the first client device; and
   sending the second GTK to the second client device.

20. The computer-readable medium of claim 19, wherein generating the GMK comprises:
   sending the join request to a Authentication, Authorization, Accounting (AAA) server, wherein the AAA server generates the GMK; and
   receiving the GMK from the AAA server.

\* \* \* \* \*